July 5, 1932.  J. L. BROWN  1,866,344
TERMINAL BOX FOR MOTORS
Filed May 20, 1930
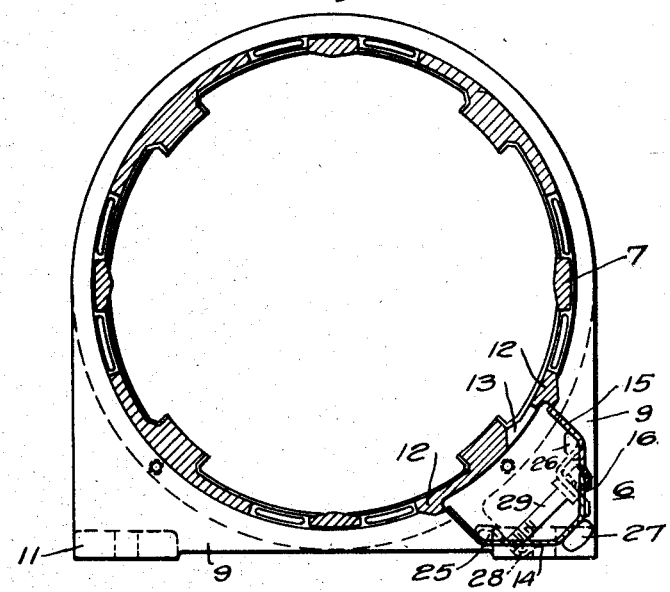
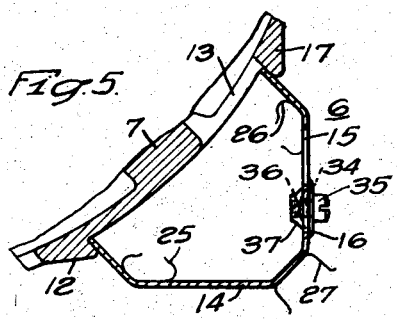
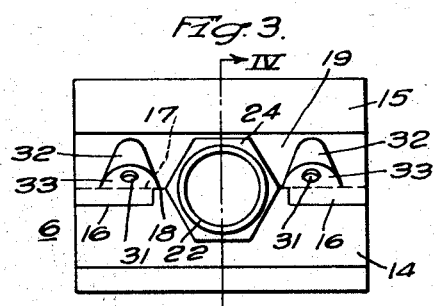
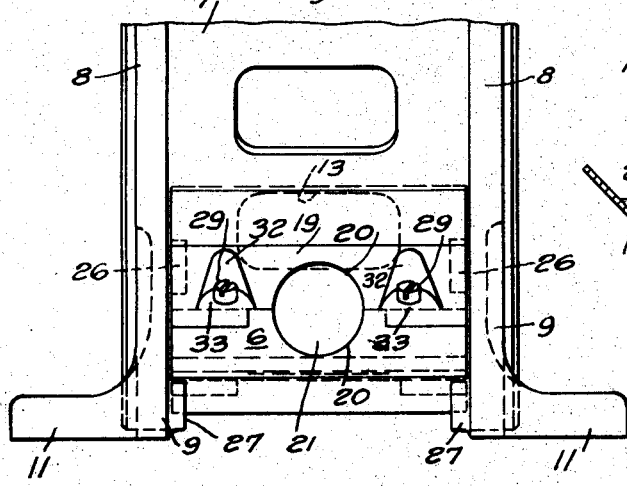
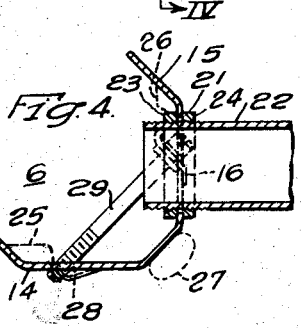
INVENTOR
John L. Brown.
BY
ATTORNEY Patented July 5, 1932

1,866,344

UNITED STATES PATENT OFFICE

JOHN L. BROWN, OF VERONA, PENNSYLVANIA, ASSIGNOR TO WESTINGHOUSE ELECTRIC & MANUFACTURING COMPANY, A CORPORATION OF PENNSYLVANIA

TERMINAL BOX FOR MOTORS

Application filed May 20, 1930. Serial No. 453,930.

My invention relates to terminal boxes for electric motors and particularly to boxes for inclosing motor terminals and for supporting the tubular conduit in which the circuit conductors are incased.

An object of my invention is to provide a terminal box that comprises two complementary sheet-metal stampings that may be attached to the motor frame by a simple screw means which serves to hold the metal plates in assembled relation, thereby eliminating the tapped holes usually provided in the motor frame, and special bolts for attaching the box to the frame.

A further object of my invention is to provide a terminal box comprising two sheet-metal plates that, when in assembled relation, encircle the conductor conduit and retain it in operative position, and wherein the act of securing the sheet-metal plates together also secures the plates to the motor frame.

A further object of my invention is to provide a terminal box for a motor frame having end flanges, wherein the end flanges of the motor serve to co-operate with the terminal box to constitute an enclosure for the motor terminal.

A further object of my invention is to provide a terminal box for electric motors that may be stamped economically from sheet metal and may be readily attached to the motor frame when the sheet-metal plates are assembled.

These, and other objects that will be made apparent throughout the further description of my invention, are attained by means of the terminal box hereinafter described, and illustrated in the accompanying drawing, wherein;

Figure 1 is a view in transverse section through a motor frame and my improved terminal box, Fig. 2 is a side elevational view of the terminal box and a portion of the motor frame shown in Fig. 1, Fig. 3 is an elevational view of the terminal box shown in Figs. 1 and 2, Fig. 4 is a transverse sectional view of the terminal box, taken on the line IV—IV of Fig. 3, and Fig. 5 is the transverse sectional view of a modified form of terminal box.

Referring to the drawing, the terminal box 6 is applied to a frame 7 of an electric motor having end plates 8 provided with flanges 9 that extend beyond the boundary of the frame cylinder and carry attaching feet 11.

The frame is provided with a pair of longitudinally extending stop members, lugs or ribs 12 between which an opening 13 is provided through which the motor winding terminals (not shown) extend from the interior of the motor frame to a point exterior thereof, where they are accessible for attachment to the feed conductors (not shown).

The improved terminal box comprises two pressed-metal plates 14 and 15 that are assembled as indicated in Figs. 1 and 4, the plate 15 being provided with flanges 16 which overlap the outer face of the plate 14, as indicated in the drawing, the flanges being offset in order that the adjacent edges 17 and 18 of the plates shall be in the same plane when the plates are in assembled relation. A flat plane surface 19 is thus afforded near the central portion of the plates, and semicircular notches 20 in the edge of each plate constitute a circular opening 21 for receiving the usual conductor conduit 22, as indicated in Figs. 3 and 4. The conduit 22 is threaded, at its end, and is provided with the usual clamping nuts 23 and 24 which serve to clamp the conduit securely to the assembled plates 14 and 15.

The flanges 9 of the end plates 8 are provided with three lugs or stop members 25, 26 and 27 that are cast integral with the flanges and project into the space between them, as indicated in Fig. 2. The plates 14 and 15 are of such length that they fit snugly between the inner faces of the flanges, and the plate 14 is first disposed in the position indicated in Fig. 1, wherein its outer end is supported by the lug 27 and its inner end by the lug or rib 12 on the motor frame. The upper or cover plate 15 is supported by the lug 26, the inner edge thereof engaging the upper lug or rib 12 on the motor frame.

In order to secure the plates 14 and 15 in assembled relation, the plate 14 is provided with two threaded openings 28 for receiving the threaded ends of the bolts 29 which extend through openings 31 in the plate 15, the plate being provided with indentations 32, which form seats 33 for heads of the bolts 29.

In order to assemble the terminal box, the plate 14 is first placed in operative position, as shown in Fig. 1. The motor terminals are then connected to the terminals of the conductors, and the conduit is then placed in the semi-circular notch 20 in the outer edge of the plate 14 in such manner that the clamping nuts 23 and 24 are disposed on opposite sides of the plates. The cover plate 15 is then placed in the operative position shown in Fig. 1, and the bolts 29 are then tightened to draw the plates 14 and 15 into assembled operative position. The clamping nuts 24 on the conduit are finally tightened. Since the plate 14 cannot be moved outwardly from the frame, because of its engagement with the lugs 27 and 12, and cannot be lifted vertically because of the engagement with the lug 25, it is apparent that, when the cover is secured in operative position, no displacement of the conduit box, constituted by the plates 14 and 15, can take place.

By reason of this construction, the conduit box comprises two simple sheet-metal stampings and two threaded bolts and, consequently, the construction is inexpensive to manufacture and may be quickly applied to a motor.

In Fig. 5, I have shown a modified form of terminal box wherein the overlapping flanges 16 are slightly extended in length and are provided with openings 34 through which screws 35 may extend into threaded holes 36, provided in bosses 37 on the plate 14. This construction does not necessitate indentations and long bolts, such as are necessary in the construction shown in Figs. 1 and 4, and, for certain applications, the construction is more desirable.

While I have shown two embodiments of my invention, it will be apparent to those skilled in the art that various changes, modifications, substitutions, additions and omissions may be made in the apparatus illustrated without departing from the spirit and scope of my invention, as set forth in the appended claims.

I claim as my invention:

1. The combination with a motor frame having spaced lugs on the side surface and end flanges spaced apart which are provided on their inner faces with lugs, of a conduit box comprising a pair of complementary cooperating plates fitting in the space between the flanges and the lugs on the frame and supported on the lugs on the flanges, and means for releasably retaining the plates in cooperative assembled relation.

2. The combination with a motor frame having spaced stop members on the side surface and end flanges spaced apart which are provided on their inner faces with oppositely disposed stop members, of a conduit box comprising a pair of complementary cooperating plates adapted to be separately inserted between the stop members on the frame and the flanges and having means for joining them to one another and for cooperating with the said frame and the flanges to constitute a terminal housing, the said stop members on the end flanges serving to engage the housing and to cooperate with the stop members on the frame for preventing removal of the housing so long as the plates are in joined operative relation.

3. The combination with a motor frame having spaced stop members on the side surface and end plates having flanges extending transversely beyond the frame and constituting supporting feet of the frame and having oppositely disposed stop members on the inner faces thereof, of a conduit box comprising a pair of complementary cooperating plates adapted to be separately inserted between the stop members on the frame and the end plates and having means for joining them to one another and for cooperating with the frame and the flanges to constitute a terminal housing, the said stop members on the end flanges serving to engage the housing and to cooperate with the stop members on the frame for preventing removal of the housing so long as the plates are in joined operative relation.

In testimony whereof, I have hereunto subscribed my name this 15th day of May, 1930.

JOHN L. BROWN.